United States Patent [19]

Schweinzer et al.

[11] Patent Number: 5,703,135
[45] Date of Patent: Dec. 30, 1997

[54] PRODUCTION OF EXPANDED POLYOLEFIN BEADS

[75] Inventors: Jürgen Schweinzer, Frankenthal; Joachim Fischer, Grosskarlbach; Isidoor De Grave, Wachenheim; Wolfram Kögel, Mannheim, all of Germany

[73] Assignee: BASF Aktiengesellschaft, Ludwigshafen, Germany

[21] Appl. No.: 793,101

[22] PCT Filed: Aug. 11, 1995

[86] PCT No.: PCT/EP95/03190

§ 371 Date: Feb. 24, 1997

§ 102(e) Date: Feb. 24, 1997

[87] PCT Pub. No.: WO96/06129

PCT Pub. Date: Feb. 29, 1996

[30] Foreign Application Priority Data

Aug. 23, 1994 [DE] Germany .............. 44 29 844.7

[51] Int. Cl.⁶ ..................................... C08J 9/18
[52] U.S. Cl. ........................... 521/60; 521/59
[58] Field of Search .................... 521/59, 60

[56] References Cited

U.S. PATENT DOCUMENTS

| 4,532,094 | 7/1985 | Wu et al. . | |
| 5,086,078 | 2/1992 | Harclerode et al. | 521/56 |
| 5,110,524 | 5/1992 | Harclerode et al. | 521/56 |
| 5,110,836 | 5/1992 | Harclerode et al. | 521/56 |
| 5,580,503 | 12/1996 | Hall, III et al. | 521/60 |

FOREIGN PATENT DOCUMENTS

| A 1 105 745 | 12/1955 | France . |
| A 1 299 767 | 6/1962 | France . |
| 1 092 032 | 11/1967 | United Kingdom . |

*Primary Examiner*—Morton Foelak
*Attorney, Agent, or Firm*—Oblon, Spivak, McClelland, Maier & Neustadt, P.C.

[57] ABSTRACT

The invention relates to a process for the production of expanded polyolefin beads by impregnating polyolefin particles with volatile blowing agents in a fluidized bed.

7 Claims, 1 Drawing Sheet

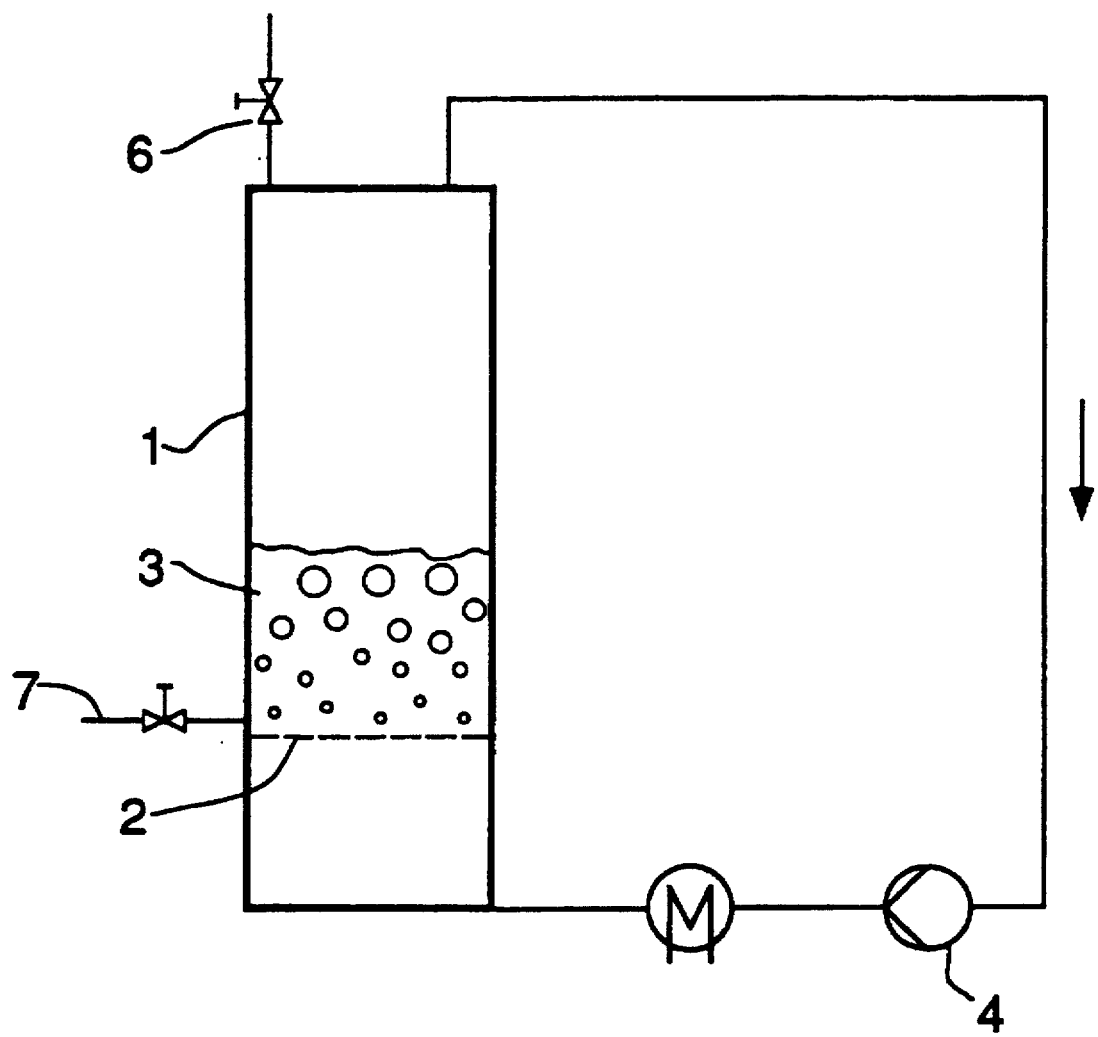

PRODUCTION OF EXPANDED POLYOLEFIN BEADS

The present invention relates to a process for the production of expanded polyolefin beads by impregnating polyolefin particles with volatile blowing agents.

Expanded polyolefin beads are produced industrially by two methods:

In the extrusion method, the polyolefin is melted and the melt mixed with a volatile blowing agent. After extrusion, the expanded polyolefin is granulated.

In the impregnation method (EP-A 53 333), uncrosslinked polyolefin particles are suspended in water and impregnated with a volatile blowing agent under pressure at a temperature in the region of the softening point of the polyolefin. The suspension is then decompressed, whereupon the polyolefin particles expand.

Attempts have also been made to carry out the impregnation in the gas phase (DE-B 1 285 722). However, this requires crosslinking of the polyolefin particles at their surface so that they do not sinter together at the temperatures used, but of course this also makes welding of the foam beads to form moldings more difficult during later processing. In addition, the surface crosslinking requires a separate step.

It is an object of the present invention to produce expanded polyolefin beads by impregnation with volatile blowing agents avoiding the extrusion method, which has high energy consumption, and suspension of the polymer particles in water (which also has high energy consumption and causes effluent problems) and avoiding crosslinking of the bead surface.

We have found that this object is achieved by impregnating particulate propylene or ethylene polymers with gaseous blowing agent in a fluidized bed.

DE-A 33 17 557 describes a process for the production of expandable polyolefin beads in which polyolefin particles kept in the fluid state are impregnated with a blowing agent in the gas phase. The fluid state is achieved by means of rotating vessels or by using stirrers. Fluidization by means of a fluidized bed is not mentioned. Preferred polyolefins are graft polymers of styrene on polyethylene. These polymers, which contain relatively large amounts of polystyrene chains, are capable of keeping volatile blowing agents absorbed for an extended period. However, this is not the case in conventional ethylene and propylene polymers, which means that expandable polyolefin particles cannot be produced by this method.

Although the fluidized-bed method is a common one in chemical technology, it was not obvious that impregnation of polyolefin particles in the region of the softening point can be carried out simply and without sticking. In contrast to conventional impregnation methods, reactor internals are unnecessary.

For the purposes of the present invention, polyolefins are crystalline olefin polymers whose X-ray crystallinity at 25° C. is greater than 25%. Suitable polyolefins for the process are low-density polyethylene (LDPE), medium-density polyethylene (MDPE) and high-density polyethylene (HDPE), polypropylene and ethylene and propylene copolymers containing at least 50 mol % of ethylene and/or propylene units. Examples of suitable comonomers are α-olefins having up to 12 carbon atoms, such as propylene, butene, pentene, hexene and octene, vinyl esters, such as vinyl acetate, esters of acrylic acid, methacrylic acid, maleic acid or fumaric acid with alcohols containing 1 to 8 carbon atoms, and ionomers. The olefin polymers generally have a melt flow index, MFI (230, 2.16; measured in accordance with DIN 53 735) of from 0.1 to 20, preferably from 0.5 to 15, and a crystallite melting point of from 95° to 170°C. It is also possible to use mixtures of various olefin polymers.

Preference is given to copolymers of propylene with from 0.5 to 15% by weight of ethylene or a $C_4$- to $C_8$-α-olefin and copolymers of ethylene with from 3 to 18% by weight of a $C_4$- to $C_8$-α-olefin (LLDPE).

Particularly preferred polyolefins are copolymers comprising from 1 to 6% by weight of ethylene and from 94 to 99% by weight of propylene.

The particle size of the polyolefin particles can vary within broad limits of from 0.1 to 6 mm, preferably from 0.5 to 4 mm. The particles can be in the form of granules, grit or powder.

Suitable blowing agents are basically all organic and inorganic substances which are gaseous at the chosen temperatures, for example hydrocarbons, fluorinated and chlorinated hydrocarbons, carbon dioxide, nitrogen and noble gases. It is also possible to employ mixtures of these gases. Preferred blowing agents are propane, butanes, pentanes, hexanes and carbon dioxide. When butane is used, as is particularly preferred, in practice small amounts of nitrogen are frequently present if the reactor has been flushed with nitrogen before commencement of the impregnation. A further preferred blowing agent is ammonia, which can likewise be employed as a mixture with nitrogen.

The drawing shows a diagram of the preferred impregnation reactor. (1) denotes the fluidized-bed reactor, generally cylindrical, with heat-insulated or heatable jacket, (2) denotes the gas diffuser base, onto which a bed (3) of polyolefin particles is introduced via the fill opening (6). The blowing agent is circulated in the arrowed direction by means of a circulating-gas compressor (4). A heat exchanger (5) establishes and maintains the operating temperature. When the impregnation is complete, decompression is effected at (7), whereupon the polyolefin particles, now containing blowing agent, expand. The fundamental principles of the fluidized-bed process are described, for example, in Fluidization Engineering by Daizo Kunii and Octave Levenspiel, 2nd Edition, Butterworth, 1991.

The temperature is kept in the region of the melting point of the polyolefin, preferably at from 50° C. below to 30° C. above the crystallite melting point of the polyolefin, determined by the DSC method. The crystallite melting point is the maximum of the DSC curve obtained by heating from 3 to 6 mg of the polyolefin granules to 220° C. at a heating rate of 20° C./min by means of a differential calorimeter. Experience shows that hydrocarbons lower the crystallite melting point of polyolefins, and in this case a lower region for the impregnation temperature can be selected. In the case of butane and a copolymer of propylene containing 3% by weight of ethylene, the preferred range is from 100° to 145° C.

The pressure during the impregnation should preferably be at least 25%, in particular at least 40%, of the saturation vapor pressure of the blowing agent at the operating temperature. In the case of butane, the optimum pressure is in the range from 10 to 30 bar.

The gas velocity U at which the blowing agent is circulated satisfies the condition $$U-UMF=0.02 \text{ to } 1.5 \; m \cdot sec^{-1}, \text{ preferably}$$

$$U-UMF=0.05 \text{ to } 1.5 \; m \cdot sec^{-1},$$

where U is the empty-tube gas velocity, based on the free cross section of the fluidized-bed reactor above the bed, UMF is the minimum fluidization velocity of the particles under the particular operating conditions. The procedure for experimental determination of the minimum fluidization velocity and an equation for calculating the latter are given in Fluidization Engineering, Chapter 3. In the case of butane and a particle size of 1 mm, the preferred empty-tube gas velocity is from 0.15 to 0.8 m·sec$^{-1}$.

The duration of the impregnation operation varies in broad limits from 10 minutes to 2 hours, preferably from 20 to 90 minutes. It can be shortened by preheating the reactor and/or the polyolefin particles before introduction into the fluidized bed.

The novel process gives expanded polyolefin beads having a bulk density of from 10 to 250 g·l$^{-1}$, preferably from 15 to 150 g·l$^{-1}$. The bulk density can be adjusted to a specific value by varying the impregnation temperature, the impregnation pressure, the impregnation time and the counterpressure during decompression.

The polyolefin beads can be converted into foam moldings by known methods. These are used in automobile production, in packaging and in the production of sports and leisure equipment.

In the example, parts and percentages are by weight.

EXAMPLE 1 part of a random propylene copolymer containing 2.8% of ethylene and having a particle diameter of 1 mm was heated to 80° C. in a fluidized-bed reactor with a capacity of about 6 l without internals under an inert-gas atmosphere with simultaneous fluidization by means of the circulating-gas stream. Commencing at this temperature, 12 parts of technical-grade butane were metered continuously into the circulating-gas system over the course of 15 minutes. When the metering was complete, the gas temperature was 110° C. and the pressure in the system was 15.5 bar (absolute). The gas velocity U dropped from 0.7 to 0.4 m·sec$^{-1}$ during the reaction; the UMF is 0.11 m·sec$^{-1}$ under these conditions. The circulating gas was then heated to 128.5° C. over the course of 10 minutes, and the reactor contents were then decompressed rapidly into a collecting tank via a discharge valve. The bulk density of the resultant foam beads was 60 g·l$^{-1}$.

We claim:

1. A process for the production of expanded polyolefin beads by impregnating polyolefin particles with volatile blowing agents at a temperature at most 50° C. below and at most 30° C. above the crystallite melting point of the polyolefin, the crystallite melting point being the maximum of the DSC curve obtained by heating from 3 to 6 mg of the polyolefin granules to 220° C. at a heating rate of 20° C./min, by means of a differential calorimeter, which comprises fluidizing particulate propylene or ethylene polymers under pressure in a fluidized bed and at the same time impregnating them with a blowing agent which is gaseous at the selected temperature, and expanding the impregnated polyolefin particles by decompression.

2. A process as claimed in claim 1, wherein polyolefin particles having a particle size of from 0.1 to 6 mm are employed.

3. A process as claimed in claim 1, wherein the impregnation is carried out at a pressure which is at least 25% of the saturation vapor pressure of the blowing agent at the operating temperature.

4. A process as claimed in claim 1, wherein the polyolefin is a copolymer of propylene with from 0.5 to 15% by weight of ethylene and/or $C_4$- to $C_8$-α-olefin or a copolymer of ethylene with from 3 to 18% by weight of a $C_3$- to $C_{10}$-α-olefin.

5. A process as claimed in claim 1, wherein the blowing agent is propane, a butane, a pentane, a hexane or carbon dioxide, or a mixture thereof.

6. A process as claimed in claim 1, wherein the blowing agent is ammonia or a mixture of ammonia with nitrogen.

7. A process as claimed in claim 1, wherein the gas velocity U at which the blowing agent is circulated satisfies the condition $$U-UMF=0.02 \text{ to } 1.5 \ m \cdot sec^{-1},$$

where UMF is the minimum fluidization velocity of the polymer particles under the particular operating conditions.

* * * * *